J. W. STUART.
CONCRETE MIXER.
APPLICATION FILED APR. 26, 1909.

930,900.

Patented Aug. 10, 1909.

Witnesses:
E. Behel.
C. B. Clark

Inventor:
James W. Stuart.
By A. O. Behel
Atty.

UNITED STATES PATENT OFFICE.

JAMES W. STUART, OF FREEPORT, ILLINOIS.

CONCRETE-MIXER.

No. 930,900. Specification of Letters Patent. Patented Aug. 10, 1909.

Application filed April 26, 1909. Serial No. 492,425.

*To all whom it may concern:*

Be it known that I, JAMES W. STUART, a citizen of the United States, residing at Freeport, in the county of Stephenson and State of Illinois, have invented certain new and useful Improvements in Concrete-Mixers, of which the following in a specification.

The object of this invention is to construct a concrete mixer in which the sand or gravel and cement are fed onto the center of a revolving pan and which is worked toward the periphery of the pan by suitable deflecting plates and centrifugal force, the pan having an upturned edge and a plate adapted to carry the mixture up the upturned edge and free of the pan.

Figure 1:
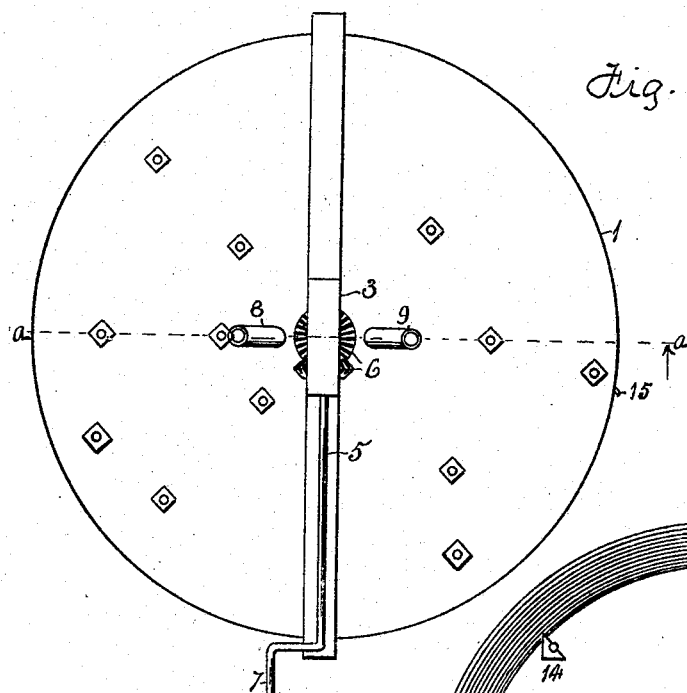
Figure 2:
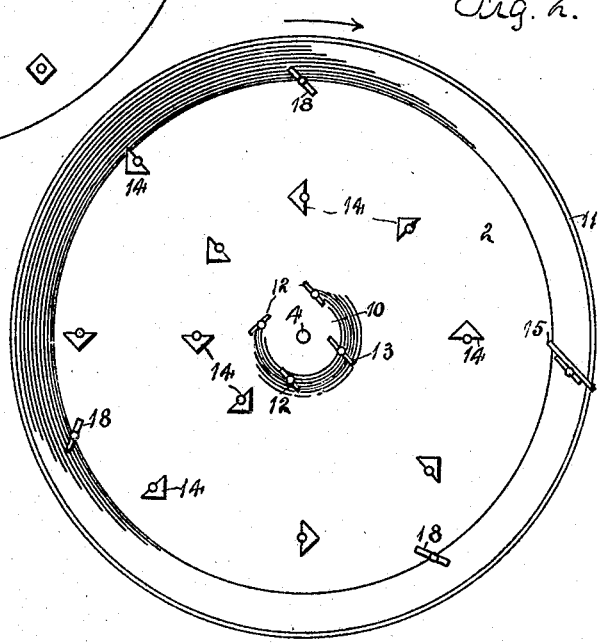
Figure 3:
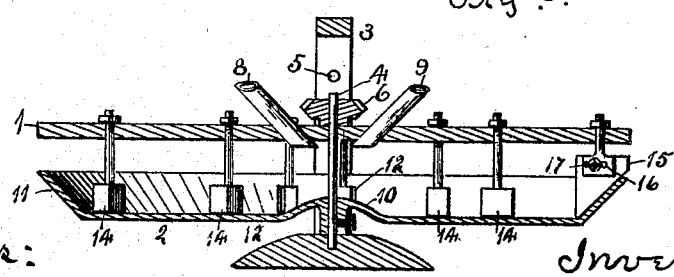

In the accompanying drawings, Figure 1 is a plan view of a concrete mixer containing my improvements. Fig. 2 is a plan view of the rotatable pan in which the deflecting plates are located in position thereon. Fig. 3 is a vertical section on dotted line *a a* Fig. 1.

My improved concrete mixer comprises a stationary plate 1, and a rotatable pan 2 held suitably separated. The stationary plate 1 supports a yoke 3 which form bearings for the horizontally arranged shaft 5 which is drivingly connected to a vertically arranged shaft 4 by the miter gears 6. This vertical shaft extends through the stationary plate 1 and has a fixed connection with the rotatable pan 2, so that the pan can be revolved by the handle 7 or power connected with the horizontal shaft 5.

The stationary plate 1 has a spout 8 extending through it through which sand and gravel is fed onto the center of the pan, and a spout 9 also extends through the stationary plate and through which cement is delivered onto the center of the pan. The rotatable pan 2 has its center 10 elevated and also has an inclined rim 11.

To the stationary plate 1 are connected a number of deflecting plates 12 arranged around the elevated center of the pan and each tending to move the sand and cement toward the center of the pan. A deflecting plate 13 is secured to the stationary plate and set to move the sand and cement outward from the crowning center of the pan. Between the crowning center of the pan and the bottom of the beveled edging thereof are located double deflecting plates 14 in double mold board plow form. These double deflecting plates are connected to the stationary plate and are capable of being turned axially to present the faces thereof at varying angles to the material supported by the pan.

A delivering plate 15 is connected to the stationary plate and is located in contact with the inclined rim, and is made adjustable by means of a slot 16 and bolt 17, so that it may be moved radially with respect to the pan so as to extend over the full width of the edging or any part thereof from its periphery inward. The pan is rotated by means of the handle or power applied thereto, the rapidity of the rotation is sufficient to move the sand and cement toward the beveled edging of the pan. The material being fed onto the crowning center of the pan will be moved toward the center by the deflecting plates 12 until the deflecting plate 13 is reached, which owing to its tangential position with respect to the crowning center, will move the mixture onto the flat or bottom portion of the pan. The deflecting plates 14 will move the mixture toward and from the center of the pan until the rim 11 is reached, when the delivering deflecting plate 15 will cause the mixture to be discharged over the rim into a suitable receptacle. The deflecting plates serve to thoroughly mix the sand or gravel and cement together to which is added the proper quantity of water. I have not deemd it necessary to show the water connections as such is well known.

Adjacent to the inner edge of the rim are located deflecting plates 19 which serve to move the mixture inward from the rim, to more thoroughly mix the ingredients.

I claim as my invention.

1. In a concrete mixer, the combination of a stationary plate, deflecting plates supported by the stationary plate, a rotatable pan located beneath the stationary plate and having an outwardly inclined rim, and a discharging deflector contacting with the inner surface of the rim and located diagonally across it.

2. In a concrete mixer, the combination of a stationary plate, deflecting plates supported by the stationary plate, a rotatable pan located beneath the stationary plate, the pan formed with an oval crowning center and an outwardly inclined rim, a discharging deflector contacting with the inner surface of the rim and located diagonally across it, some of the deflecting plates located adjacent to the crowning center and tending to move the mixture toward the center and other deflecting plates tending to move the mixture away from the center, and a feed spout discharging the mixture on the crowning center.

In testimony whereof I have hereunto set my hand in presence of two subscribing witnesses.

JAMES W. STUART.

Witnesses:
A. O. BEHEL,
E. D. E. N. BEHEL.